No. 779,750.

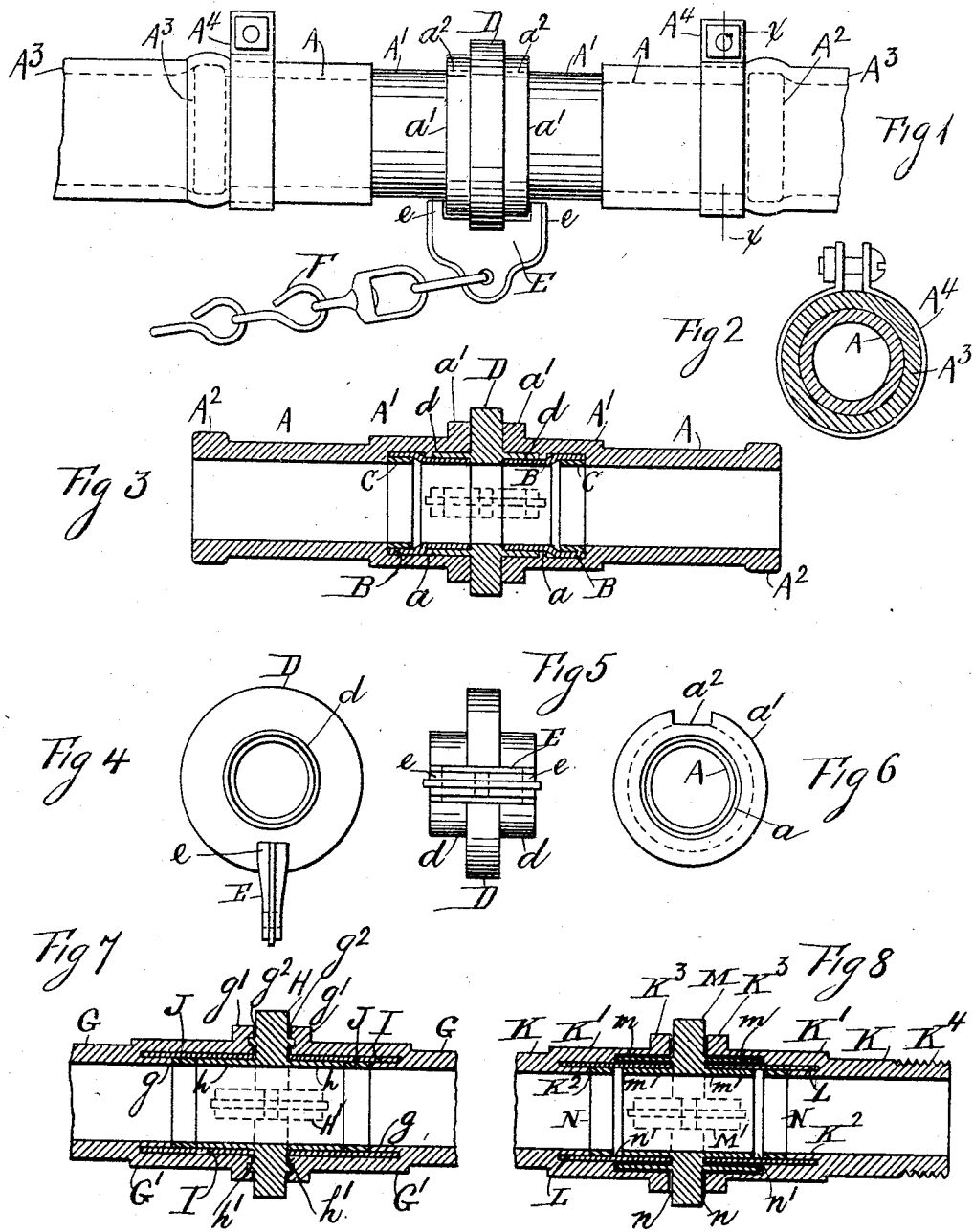

Patented January 10, 1905.

UNITED STATES PATENT OFFICE.

EDWARD VOGEL, OF NEW YORK, N. Y., ASSIGNOR OF ONE-HALF TO JACOB ANTON ONDRAK, OF NEW YORK, N. Y.

COUPLING.

SPECIFICATION forming part of Letters Patent No. 779,750, dated January 10, 1905.

Application filed May 3, 1904. Serial No. 206,104.

*To all whom it may concern:*

Be it known that I, EDWARD VOGEL, a citizen of the United States, and a resident of the borough of Manhattan, in the county of New York and State of New York, have invented certain new and useful Improvements in Couplings, of which the following is a specification.

This invention relates to couplings; and its organization comprises two conduits or pipes, a flexible packing attached to each pipe, a central sleeve connecting the flexible packings and locking and connecting the ends of the pipes.

The invention is also characterized by being applicable to conduits that carry fluids under pressure, a vacuum, or either.

Figure 1 represents a front elevation of the coupling connected with ordinary hose. Fig. 2 shows a section of Fig. 1 on the line $x$ $x$. Fig. 3 shows a partial horizontal axial section of Fig. 1. Fig. 4 is an end view of the central sleeve. Fig. 5 is a bottom plan view of said sleeve. Fig. 6 represents an end view of one of the pipes. Fig. 7 shows an axial longitudinal section of a modification of the invention. Fig. 8 is a further modification shown in an axial longitudinal section.

The coupling comprises the pipes A, with the bell ends A' and hub ends $A^2$, the latter having conduits of hose $A^3$, secured thereto with the clamps $A^4$. The bell ends have the shoulders $a$ extending from about the middle portions of their inner cylindrical surfaces. Flexible packing-rings $b$ extend about the whole length of the bell ends and are secured therein by means of the expansion-rings C. A central sleeve D, with tubular ends $d$, is arranged to fit into the bell ends of the pipes and to surround the ends of the packing-rings B. A yoke E extends from the said sleeve D and has jaws E, which can engage the flanges $a'$ of the bell ends A'. The said flanges $a'$ have openings $a^2$ to allow the engagement or disengagement of the said jaws. A chain F leads from the central sleeve D to a point of support.

The form of coupling in Figs. 1 to 6 is arranged to carry a fluid, whether a liquid or a gas under pressure, and is especially applicable for use with the air and steam pipes of railway-cars.

In Fig. 7 the coupling is arranged to carry a fluid with a vacuum and comprises the pipes G, with the bell ends G', a central sleeve H, with the tubular ends $h$, and generally projecting collars H'. Flexible packing-rings I are held in the bell ends by means of the tubular projections $g$ of the pipes G and the expansion-rings J. A yoke H' is arranged to engage the flanges $g'$ of the bell ends G', as described for Figs. 1 to 6.

In Fig. 8 the coupling is arranged to be used for either a fluid under a vacuum or pressure and comprises the pipes K, with the bell ends K', in which latter are secured the flexible packing-rings L, held in place by the tubular projections $K^2$ of the pipes K, and the expansion-rings N. A central sleeve M has extending from its sides the tubular projections $m$ $m'$, that surround the packing-rings L, and a yoke M' extends from said sleeve, which engages the flanges $K^3$ of the bell ends of the pipes, as explained for Figs. 1 and 6. The end of one of the pipes K is threaded, as shown at $K^4$, for a screw connection.

To operate the invention, and referring to Figs. 1 to 6, the pipes A, with their hose $A^3$, are each brought adjacent to the central sleeve D, so that the openings $a^2$ will be on top and in line. One of the tubular projections $d$ of the central sleeve D is inserted into one of the bell ends A' and surrounded by the packing B therein. Next the bell end of the accompanying pipe is connected with the central sleeve D, the latter so placed that the jaws $e$ are on top and pass through the openings $a^2$. The yoke $e$, with its jaws, is then turned down one hundred and eighty degrees to the position shown in Fig. 1, when the latter will be locked with the flanges $a'$ of the bell ends A', and the weight of the chain F will maintain the yoke in the locked position until it is required to uncouple the coupling, when the yoke is turned up until the jaws $e$ come opposite the openings $a^2$, when the bell ends can be pulled away from the central sleeve D, and thereby uncouple the coupling. When pressure is maintained in the pipes A, it will force the packing-rings B against the internal surfaces of the tubular projections $d$ and secure a tight joint in the coupling, while at the same time a uniform opening or conduit is secured through the pipes.

In Figs. 7 and 8 the coupling and uncoupling and the locking of the pipes with their central sleeves are similar to the method described for Figs. 1 to 6. In Fig. 7, which is a coupling to be used for conduits under a vacuum, it will be noted that when a vacuum is maintained in the pipes G air-pressure from the outside can pass through the spaces $g^2$ between the end faces of the bell ends G and the central sleeve H, which pressure bearing on the outside cylindrical surfaces of the packing-rings I presses them against the tubular ends $h$ and forms tight joints in the coupling. In Fig. 8 when a vacuum is maintained in the pipes K outside pressure passing through the openings $n$ between the end faces of the bell ends K' and the central sleeve M will force the packing-rings L against the outside surfaces of the tubular projections $m'$, and when a pressure is maintained in the pipes it will force the said packing-rings against the inner cylindrical surfaces of the tubular projections $m$ by passing through the openings $n'$, and thus in either case tight joints will be maintained through the coupling.

Having described my invention, I claim—

1. In a coupling the combination of a central sleeve, tubular projections extending therefrom, a yoke extending from the central sleeve, pipes with flanges and having their flanges adjacent to the opposite faces of the central sleeve, jaws on the said yokes arranged to lock with the flanges of the pipes, a packing-ring secured in the end of each pipe and arranged to bear against the tubular projections.

2. In a coupling the combination of two pipes, flanges having openings on the ends of the pipes, a central sleeve joining the faces of the said flanges, a yoke extending from the central sleeve and arranged to lock each of the flanges with said sleeve, tubular projections extending from the opposite faces of the central sleeve and arranged to enter the pipes, packing-rings in the ends of the pipes bearing against the said tubular projections.

3. In a coupling the combination of two pipes, bell ends on the pipes, flanges on the ends of the bell ends having openings, a central sleeve with its opposite faces adjacent to the end faces of the flanges, tubular projections extending from the central sleeve and into the bell ends, collars extending from the inner cylindrical faces of the bell ends, packing-rings in the bell ends, the inner cylindrical surfaces of the packings in line with the bore of the pipes, expansion-rings holding the packing-rings in the bell ends, the internal surfaces of the rings in line with the bore of the pipes, a yoke extending from the central sleeve, jaws extending from the yoke and arranged to clear in the openings in the said flanges, and lock the flanges with the central sleeve, and a chain extending from the yoke.

Signed at New York, in the county of New York and State of New York, this 29th day of April, A. D. 1904.

EDWARD VOGEL.

Witnesses:
M. H. COOK,
HENRY C. KARLSON.